United States Patent [19]

Hanami

[11] Patent Number: 5,748,162
[45] Date of Patent: May 5, 1998

[54] LOW VOLTAGE LIQUID CRYSTAL DISPLAY DEVICE

[75] Inventor: Takayoshi Hanami, Chiba, Japan

[73] Assignee: Seiko Instruments Inc., Japan

[21] Appl. No.: 409,051

[22] Filed: Mar. 22, 1995

[30] Foreign Application Priority Data

Mar. 23, 1994 [JP] Japan .................. 6-052246

[51] Int. Cl.[6] ........................ G02F 1/13
[52] U.S. Cl. ............... 345/87; 345/94; 349/34; 349/101; 349/179
[58] Field of Search ............... 345/89, 95, 96, 345/99, 100, 87, 94; 359/106, 102, 55, 99; 349/33, 34, 98, 99, 100, 101, 102, 103, 179, 180, 181, 186, 37, 96

[56] References Cited

U.S. PATENT DOCUMENTS

| | | | |
|---|---|---|---|
| 4,824,211 | 4/1989 | Murata | 350/332 |
| 5,093,736 | 3/1992 | Iijima | 359/55 |
| 5,151,803 | 9/1992 | Wikita et al. | 359/56 |
| 5,514,297 | 5/1996 | Shinjo et al. | 252/299.61 |

FOREIGN PATENT DOCUMENTS

| | | | |
|---|---|---|---|
| 420129 | 4/1991 | European Pat. Off. | |
| 443248 | 8/1991 | European Pat. Off. | |
| 0256324 | 11/1986 | Japan | 359/102 |
| 0314520 | 12/1988 | Japan | 345/87 |
| 0259041 | 9/1994 | Japan | 345/87 |

*Primary Examiner*—David E. Harvey
*Attorney, Agent, or Firm*—Adams & Wilks

[57] ABSTRACT

A liquid crystal device capable of being driven on a time division basis includes a liquid crystal panel sandwiching a liquid crystal layer having a twisted helical structure and preferably being disposed inside a pair of opposing polarizers, and a driving circuit for driving the liquid crystal panel. The liquid crystal layer if formed of a nematic liquid crystal material having a helical structure twisted by at least 180 degrees and the panel is driven on a time division driving basis in which the bias ratio is no less than ¼ and no greater than ½. The driving voltage needed for operation of the liquid crystal device can thereby be substantially decreased.

19 Claims, 6 Drawing Sheets

LOW VOLTAGE LIQUID CRYSTAL DISPLAY DEVICE

BACKGROUND OF THE INVENTION

The present invention relates to a photoelectric device using liquid crystal material and which is used in a system such as a computer terminal, an image display apparatus, and a shutter, and more particularly, to a liquid crystal photoelectric device driven with a low voltage.

BACKGROUND INFORMATION

The twisted nematic liquid crystal material used in the prior art liquid crystal display device ("LCD") has a structure in which a liquid crystal molecule layer is twisted 90 degrees. In driving the liquid crystal device, since the number of driving circuits and the number of connections of the electrode terminals increase in correspondence with an increase in the number of segments, a time divisional driving system is generally used which is based on an optimal bias method when the liquid crystal device requires a large number of pixels, as in the case of a dot matrix type of liquid crystal device.

The time divisional driving system will be described below. As shown in FIG. 2, a group of scanning electrodes 5 and an orthogonal group of signal electrodes 6 oppose each other in a matrix manner. Each of the scanning lines is sequentially applied with a selecting waveform. The signal electrodes are supplied with an ON waveform or OFF waveform in synchronism with the application of a selecting waveform to the scanning electrodes. All the pixels formed at the intersections of the scanning electrodes and the signal electrodes can be set to an arbitrary display state by such an operation.

In the time divisional driving system, a selecting waveform is sequentially applied to the scanning electrodes. After the selecting waveform is completely applied to all the scanning electrodes, the same scanning is repeated again. The time period required to perform such scanning once is referred to as a frame period, and the corresponding frequency is refereed to as a frame frequency. Further, the ratio of a selection time of each of the respective scanning electrodes (a time period required to apply the selection waveform to a scanning electrode) and the frame period is referred to as a duty ratio.

In the time divisional driving system, an electric field is applied to not only an ON pixel but also an OFF pixel for this reason, a threshold value characteristic is necessary for controlling the photoelectric characteristics of an LCD and in the time divisional driving system the waveform useful for the control of a display state is applied only during a constant period of time which is determined based on a duty ratio while the waveform which does not relate to the control of the display state is applied during the remaining period of time. Since the liquid crystal responds to the applied waveform during the non-selected period of time, the effective voltage of the applied waveform during the non-selected period of time must be devised to be constant.

This is because it is necessary to make the display state average between ON pixels or OFF pixels. The driving system thus devised is referred to as a voltage averaging method and all known LCD devices using the time divisional driving system employ this system.

The photoelectric effect of a non-memory type of LCD generally possesses the foregoing dependency on the effective applied voltage. Here, the effective voltage referred to is a root mean square voltage Vrms and is defined by the following equation $$Vrms = \sqrt{\frac{1}{t_f} \int_0^{t_f} \{V(t)\}^2 dt}$$ [Equation 1]

An effective transmittance Toff of the optical characteristic responding to the effective voltage is defined by the following equation.

$$Toff = \frac{1}{t_f} \int_0^{t_f} T(t) dt$$ [Equation 2]

T(t): transmittance

Here, it should be noted that the transmittance T(t) is a periodic function having $t_f$ as a period. That is, the transmittance responds and varies to a temporal selected value to some extent and exhibits dependency on the effective voltage as a whole.

An example of the typical waveform in the voltage averaging method is shown in FIG. 3. In FIG. 3, the scanning electrodes are applied with a potential of $|(a-1)|$ as the selecting waveform, where "a" indicates a bias value and is a positive constant, and a zero potential as the non-selecting waveform. In this case, the device is driven by a waveform with a positive polarity during the first frame period and is driven by a waveform with a negative polarity during the second frame period. This is the reason why it needs to be driven by an AC current in units of two frames.

On the other hand, the signal electrodes are applied with the voltage of $-V(+V)$ as and ON waveform and the voltage of $-V(+V)$ as an OFF waveform during the frame period of the positive polarity (the negative polarity). As a result of this, the ON pixel (OFF pixel) is applied with the waveform as $V_{xi, yi}$ ($V_{xi, yj}$) of FIG. 3. Equation 3 and Equation 4 show the calculated effective voltage of the waveform applied to the ON pixel (OFF pixel) based on the equation 1, $$Von = \sqrt{1 + \frac{a^2 - 1}{N}} \cdot V$$ [Equation 3]

N: the number of duties (duty ratio: 1/N)

$$Voff = \sqrt{1 + \frac{a^2 - 4a + 3}{N}} \cdot V$$ [Equation 4]

N: The number of duties (duty ratio: 1/N)

The ratio of both the values is $$\frac{Von}{Voff} = \sqrt{\frac{N + a^2 - 1}{N + a^2 - 4a + 3}}$$ [Equation 5]

The equation 5 is a general equation which gives the ratio of the ON voltage and the OFF voltage in the effective voltage when the apparatus is driven in accordance with the voltage averaging method as shown in FIG. 3. The effective voltage ratio is a function of "a" when the number of duties N is determined from equation 5. At this time, in Equation 6 "a" shows the condition that the effective voltage ratio becomes maximum.

$$a = \sqrt{N} + 1$$ [Equation 6]

In this case, from the equation 5

$$\frac{Von}{Voff} = \sqrt{\frac{\sqrt{N}+1}{\sqrt{N}+1}} \quad \text{[Equation 7]}$$

driving system in which the bias ratio a is set to be $\sqrt{N}+1$ in accordance with the equations 6 and 7 under the 1/N duty ratio, is referred to as an optimal bias method.

The optimal bias ratio in various duty ratios is shown in the following table 1.

TABLE 1

| duty ratio | 1/8 | 1/16 | 1/32 | 1/64 |
|---|---|---|---|---|
| optimal bias ratio | 1/3.8 | 1/5.0 | 1/6.7 | 1/9.0 |

[See "Liquid Crystal Device Handbook", Nihon Gakuzyutu Shinkokai, 142 committee, pp.395–402]

SUMMARY OF THE INVENTION

As described above, the time divisional driving system of the optimal bias method provides the driving condition by which the maximum contrast ratio is theoretically obtained for the simple matrix type of liquid crystal panel because the effective voltages of the ON voltage and the OFF voltage take maximum values.

However, low voltage drive which is required in recent liquid crystal devices can not be achieved by such a time divisional driving system of the optimal bias method. This can be explained based on equation 4. For instance, Vop/a is the threshold value of the liquid crystal material required for the operation with 1/16 duty (N=16), the optimal bias (namely, a=5), the liquid crystal drive voltage 3V (Vop=3.0). Since it can be considered that the Voff is a threshold value, Equation 8 shows that the value can be calculated using the following equation 4:

$$\text{threshold value} = \sqrt{\left(1 + \frac{5^2 - 4 \times 5 + 3}{16}\right)} \times \frac{3}{5} \quad \text{[Equation 8]}$$

$$= 0.735$$

However, a threshold voltage is usually set at about 1.0 V even in the case of the lowest one used for liquid crystal material which is generally used. Therefore, such a liquid crystal device can not be achieved.

The present invention solves the above-noted problems and more particularly has, as an object, to provide a liquid crystal device which can be driven with a low voltage.

In order to solve the above problems, in accordance with the present invention, in a liquid crystal device which includes a liquid crystal panel including a pair of substrates provided inside of a pair of polarizers, the substrates having opposing electrodes and being subjected to orientation processing, and further including a liquid crystal layer provided between the substrates and composed of nematic liquid crystal having a twisted helical structure, and a circuit for driving the liquid crystal panel, the liquid crystal layer has a helical structure twisted 180 degrees or more and driving is performed based on a time divisional driving system in which a bias ratio (1/a) is set between 1/4 to 1/2.

In the liquid crystal device constructed as described above, the level of a threshold value required for liquid crystal material can be set high and as can be seen from equation 4, it is possible to drive the liquid crystal device with a low voltage. For instance, under the condition of a 1/16 duty and a liquid crystal drive voltage of 3V as in the above-mentioned case, the required threshold voltages for the liquid crystal material for a 1/2, 1/2.5 and 1/3 bias are the following:

$$\text{threshold value (1/2 bias)} = \sqrt{\left(1 + \frac{2^2 - 4 \times 2 + 3}{16}\right)} \times \frac{3}{2} \quad \text{[Equation 9]}$$

$$= 1.452 \, (V)$$

$$\text{threshold value (1/2.5 bias)} = \sqrt{\left(1 + \frac{2.5^2 - 4 \times 2.5 + 3}{16}\right)} \times \frac{3}{2.5} \quad \text{[Equation 10]}$$

$$= 1.172 \, (V)$$

$$\text{threshold value (1/3 bias)} = \sqrt{\left(1 + \frac{3^2 - 4 \times 3 + 3}{16}\right)} \times \frac{3}{3} \quad \text{[Equation 11]}$$

$$= 1.000 \, (V)$$

Therefore, using this invention's drive method makes it possible that currently available liquid crystal material can be driven at a low voltage. If a liquid crystal panel is driven by 3 volt drive method, a liquid crystal material for this drive method should have a characteristics of 0.735 threshold voltage as a result of equation 8. This means that the 3 volt drive method needs a special liquid crystal material, and so conventional liquid crystal material cannot be used in the 3 volt drive method.

Since the liquid crystal layer has the spiral structure twisted 180 degrees or more, the rising characteristic of the liquid crystal molecule is sharp for an applied voltage, and it is sensitive to a very small change of the applied voltage. Therefore, the decrease of contrast ratio due to decrease of an electric driving margin can be suppressed.

DETAILED DESCRIPTION OF THE PREFERRED EMBODIMENTS

Figure 1:
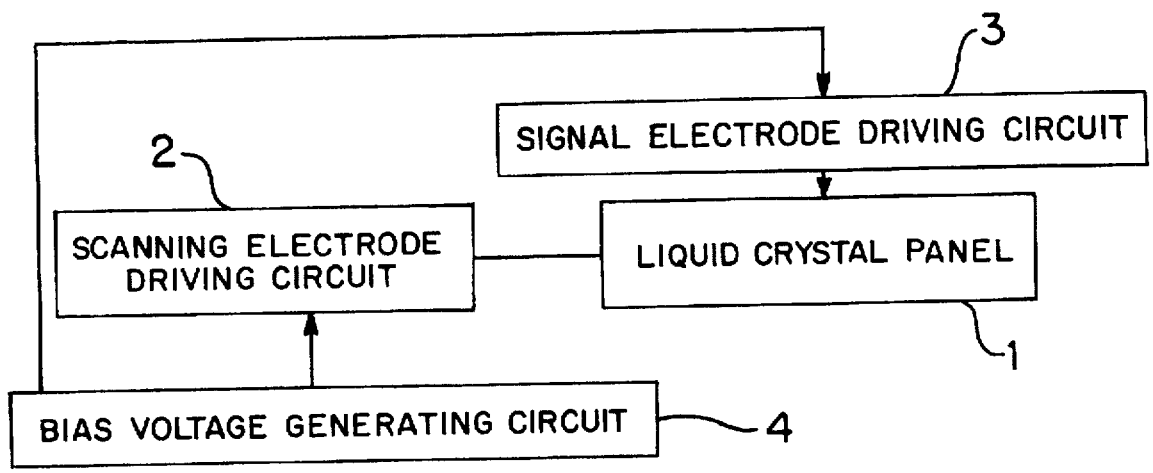
FIG. 1 is a block diagram showing the structure of a liquid crystal device according to the present invention.
Figure 2:
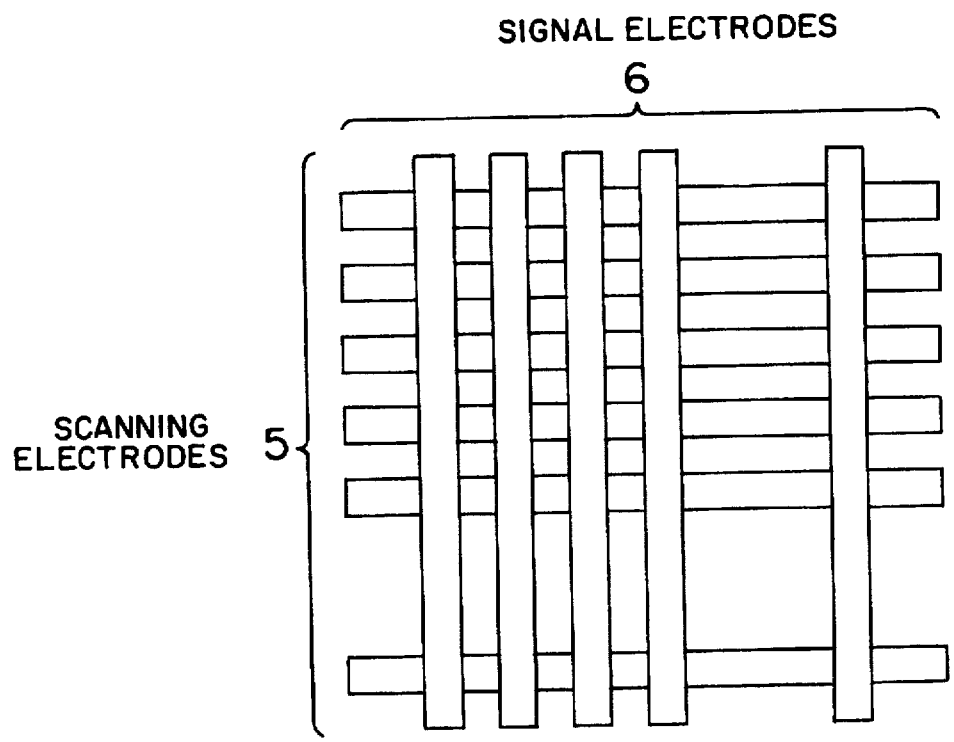
FIG. 2 is a diagram for explaining the electrode structure of a matrix type of liquid crystal device.
Figure 3:
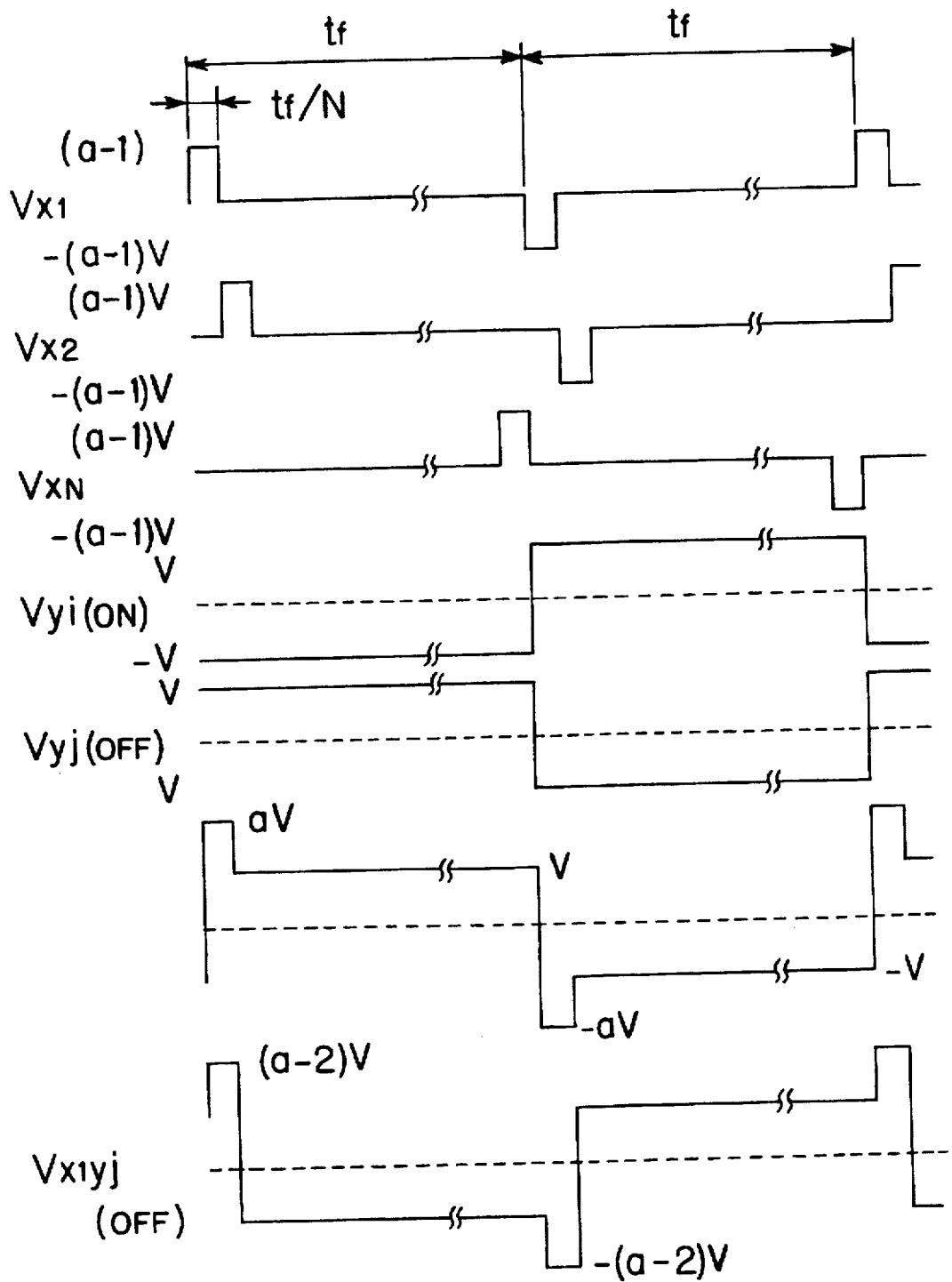
FIG. 3 is a diagram for explaining a driving method of a conventional liquid crystal device.

The preferred embodiments of the present invention will be described below in detail with reference to the accompanying drawings. FIG. 1 is a block diagram showing one of the embodiments of the present invention. In the figure, a reference numeral 1 denotes a liquid crystal panel according to the present invention The scanning electrodes and signal electrodes are connected to a scanning electrode driving circuit 2 and a signal electrode driving circuit 3, respectively. A bias voltage generated by a bias voltage generating circuit 4 is supplied to the scanning electrode driving circuit 2 and the signal electrode driving circuit 3 as a reference voltage.

Figure 4:
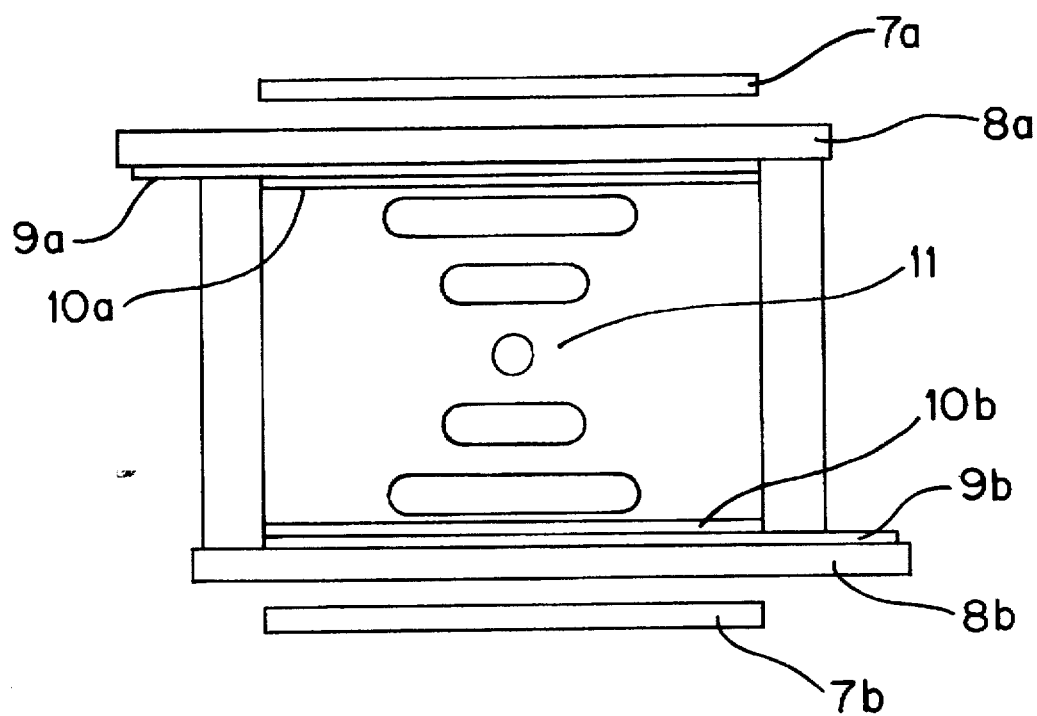
FIG. 4 is a schematic cross sectional diagram of a liquid crystal panel of the liquid crystal device according to the present invention.

FIG. 4 is a vertical cross'sectional view showing the structure of the above-mentioned liquid crystal panel 1 of FIG. 1. In the figure, reference numerals 7a and 7b denote polarizers as a pair. A pair of substrates 8a and 8b provided inside thereof have electrodes 9a and 9b and are subjected to two types of orientation processing 10a and 10b such that liquid crystal molecules are arranged to have small inclination from a horizontal direction with respect to the substrates. Between the opposing substrates, the nematic liquid crystal 11 having a positive dielectric anisotropy is sandwiched to form a helical structure twisted 180 degrees or more.

Figure 5:
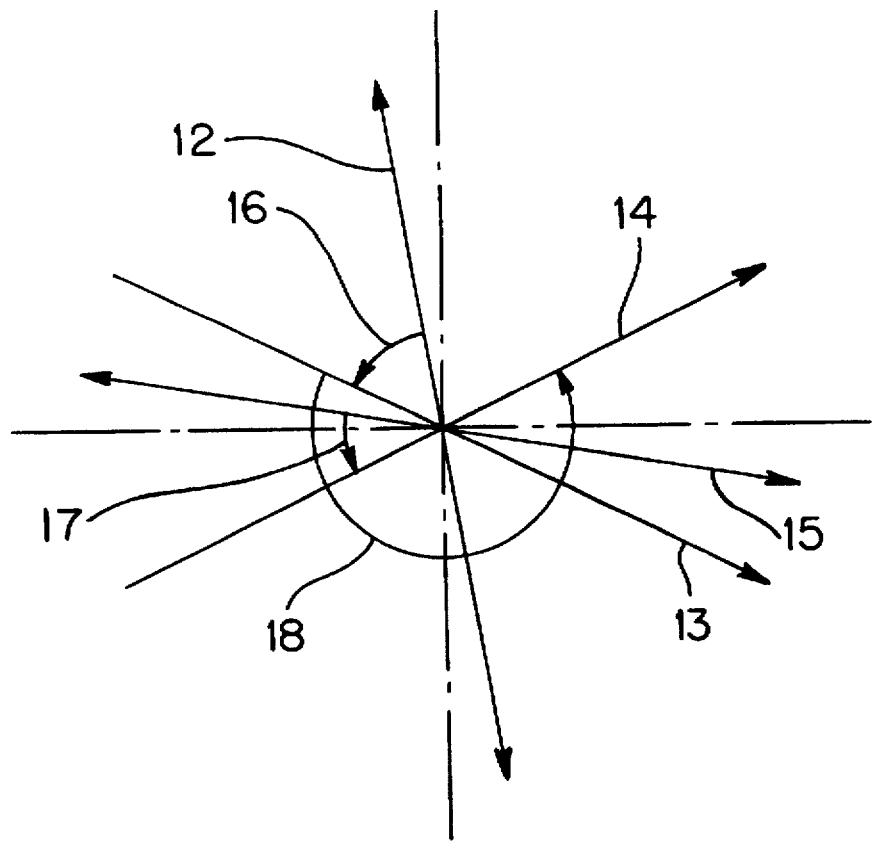
FIG. 5 is a diagram showing optical axes of the liquid crystal panel of the liquid crystal device according to the present invention.

The liquid crystal device according to the specific embodiment of the present invention and the measurement result thereof will be described below. FIG. 5 is a view showing the liquid crystal panel of FIG. 4 in the optical axis direction. A reference numeral 12 denotes the direction of the transparent axis in a upper polarizer, reference numeral 13 denotes the direction of an orientation process in an upper substrate, reference numeral 14 denotes direction of orientation process in a lower substrate, and reference numeral 15 denotes the direction of the transparent axis in a lower polarizer. A reference numeral 16 denotes the angle from the transparent axis direction of the upper polarizer to the orientation direction of the upper substrate (to be referred to as "[A]" hereinafter), reference numeral 17 denotes the angle from the transparent axis direction of the lower polarizer to the orientation direction of the lower substrate (to be referred to as "[B]" hereinafter), and a reference numeral 18 denotes the angle from the orientation direction of the upper substrate to the orientation direction of the lower substrate (to be referred to as "[C]" hereinafter). The liquid crystal molecules have the spiral structure twisted in the counter-clockwise direction. It should be noted that the angle has the sign "+" in the counter-clockwise direction.

An example of the positive mode is shown in which a black level of a display color is increased (light is further shielded) as the applied voltage is increased.

(Example 1)

Figure 6:
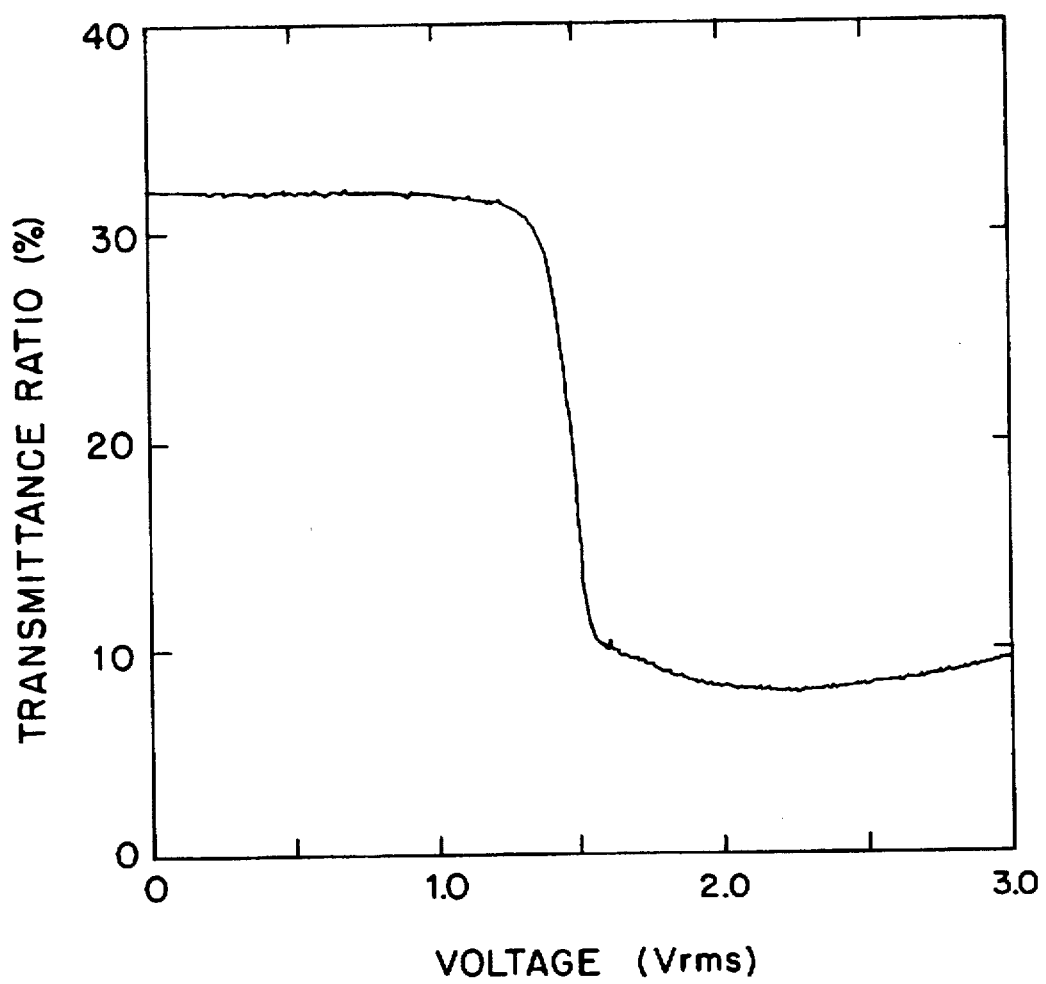
FIG. 6 is a diagram showing the voltage-transmittance characteristic of liquid crystal of the liquid crystal device according to the present invention.

A liquid crystal panel is used in which the thickness d is 6.5 (μm), And is 0.83 (μm). [A]=55°, [B]=55°, and [C]= 240°. FIG. 6 is a diagram showing a voltage-transmittance characteristic of the liquid crystal panel used in the present embodiment.

Figure 7:
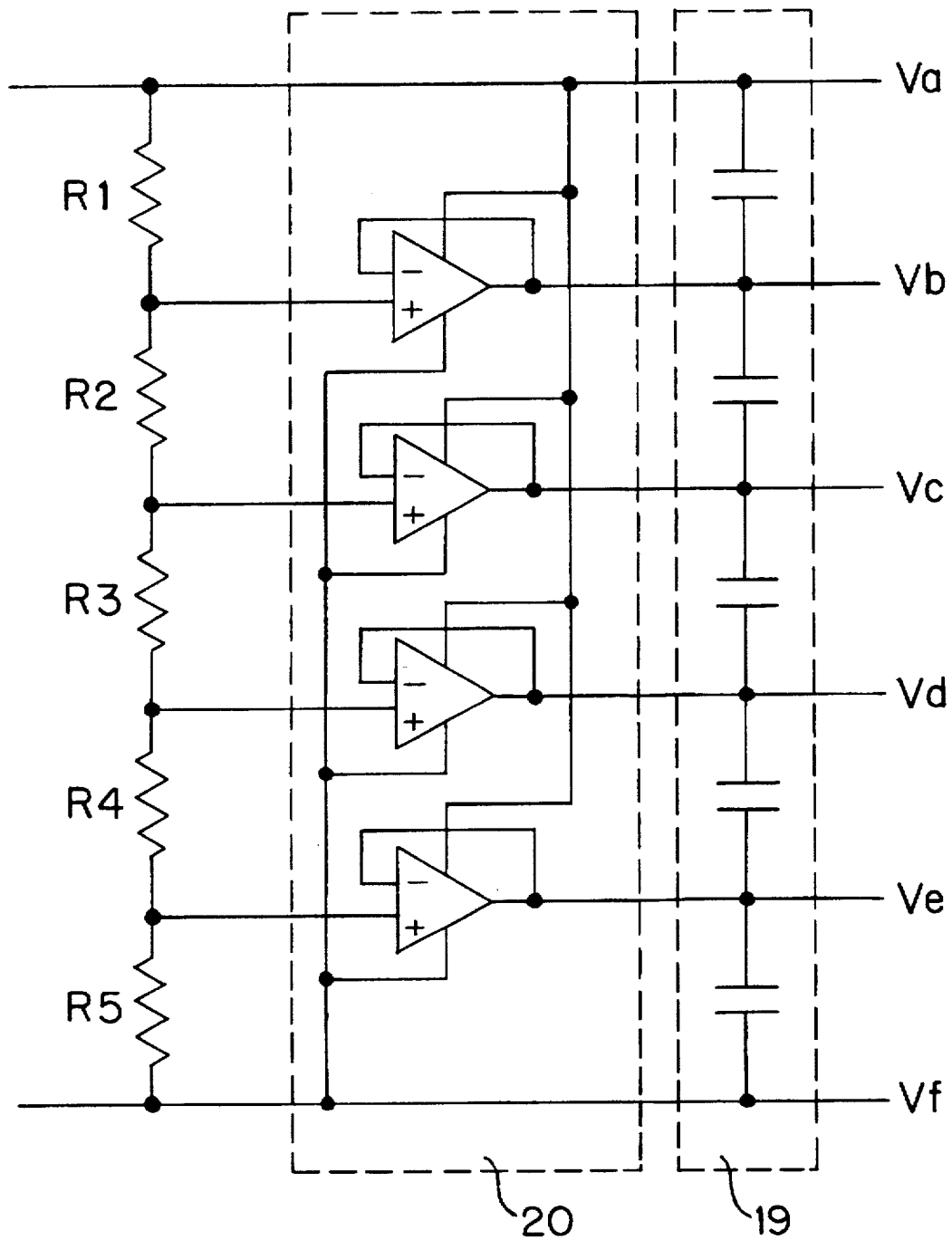
FIG. 7 is a diagram showing the structure of a bias voltage generating circuit of a liquid crystal device according to the present invention.

FIG. 7 is a diagram showing the structure of a bias voltage generating circuit used in the example 1. The reference voltages of six levels, Va, Vb, Vc, Vd, Ve and Vf (the reference voltages of three levels in ½ bias and those of four level in ⅓ bias) are produced from the liquid crystal driving voltage Vop by a method of voltage division by use of resistors as bias voltages. It should be noted that a capacitor may instead be provided between the bias voltages as shown in the figure by the dashed line section 19 or the stabilization of voltage level may be achieved via a device such as an operational amplifier as shown in the figure by the dashed line section 20.

The reference voltages produced for bias ratios and the meanings are shown in the table 2, respectively.

TABLE 2

| reference voltage | 1/2 ≦ bias ratio < 1/3 when a bias ratio = 1/2, there are 3 levels of Va = Vb, Vc = Vd, Ve = Vf. | 1/3 ≦ bias ratio < 1/4 when a bias ratio is 1/3, there are 4 levels of Va, Vb = Vc, Vd = Ve, Vf. |
|---|---|---|
| Va | common selection, segment selection level | common selection, segment selection level |
| Vb | segment non-selection level | common non-selection level |
| Vc | common non-selection level | segment non-selection level |
| Vd | common non-selection level | segment non-selection level |
| Ve | segment non-selection level | common non-selection level |
| Vf | common selection, segment selection level | common selection, segment selection level |

Next, the measuring result of the driving voltages and contrast ratio in the liquid crystal device according to the present invention and prior art liquid crystal device are shown. The same liquid crystal panel is used for the measurement.

TABLE 3

|  | drive voltage (V) | contrast ratio |
|---|---|---|
| liquid crystal device (LCD) of the present invention (1/16 duty, 1/2 bias) | 2.9 | 3.0 |
| LCD of the present invention (1/16 duty, 1/2.5 bias) | 3.5 | 3.1 |
| LCD of the present invention (1/16 duty, 1/3 bias) | 3.9 | 3.1 |
| LCD of the present invention (1/16 duty, 1/3.5 bias) | 4.4 | 3.2 |
| conventional LCD (1/16 duty, 1/5 bias) | 5.4 | 3.3 |

As seen from table 3, in the liquid crystal device according to the present invention, it is possible to decrease the driving voltage of the liquid crystal panel to the great extent and the drop of the contrast ratio can be suppressed to a level in which no problem would be caused in practice.

(Example 2)

The liquid crystal panel used in the example 1 is used and it is driven with a duty ratio in the range of 1/32 to 1/64. As a result, the driving voltage can be decreased in same manner. The result is shown in the table 4.

TABLE 4

|  | drive voltage (V) | contrast ratio |
|---|---|---|
| LCD of the present invention (1/32 duty, 1/3 bias) | 4.2 | 2.9 |
| conventional LCD (1/32 duty, 1/6.7 bias) | 7.1 | 3.2 |
| LCD of the present invention (1/64 duty, 1/3 bias) | 5.1 | 2.4 |
| conventional LCD (1/64 duty, 1/9 bias) | 9.6 | 3.0 |

It should be noted that although the result in the duty ratio up to 1/64 is shown in the present embodiment, the similar result can be obtained even in a case where the duty ratio exceeds 1/64, if a liquid crystal panel having further sharp threshold characteristic is used.

As described above, according to the present invention, it is possible to drive a liquid crystal device with a low voltage, and therefore the liquid crystal device having a low power consumption can be obtained.

What is claimed is:

1. A liquid crystal device comprising: a liquid crystal panel having a pair of substrates provided inside a pair of opposing polarizers, the substrates having opposing electrodes, and a liquid crystal layer provided between the substrates and composed of a nematic liquid crystal material having a twisted helical structure; and a driving circuit for driving the liquid crystal panel; wherein the liquid crystal material has the helical structure twisted by at least 180 degrees and the driving circuit includes means for driving the liquid crystal panel on a time divisional driving basis in which a bias value "a" is greater than or equal to 2 and less than 4.

2. A liquid crystal device according to claim 1; wherein the time divisional driving basis has a duty "N" equal to or greater than 16.

3. A liquid crystal device according to claim 1; wherein the substrates each have an orientation processed surface such that the molecules of the liquid crystal material are arranged to have a small inclination with respect to the substrates.

4. A liquid crystal device comprising: a liquid crystal panel comprising first and second substrates, a plurality of signal electrodes disposed on a first surface of the first substrate, a plurality of selecting electrodes disposed on a first surface of the second substrate so as to be orthogonal to and opposing the plurality of signal electrodes with a predetermined gap therebetween, a first polarizer disposed on a second surface of the first substrate opposing the first surface, a second polarizer disposed on a second surface of the second substrate opposing the first surface, and a liquid crystal material layer disposed in the gap between the signal electrodes and the scanning electrodes; and a driving circuit for driving the liquid crystal panel, the driving circuit comprising a scanning electrode driving circuit for sequentially applying selecting signals to the respective scanning electrodes, a signal electrode driving circuit for applying data signals to the signal electrodes in synchronism with the application of selecting signals to the scanning electrodes to selectively alter the optical transmittance of the liquid crystal material, and a bias voltage generating circuit for applying a bias voltage to the respective scanning electrodes and signal electrodes; wherein the liquid crystal material comprises a twisted helix nematic liquid crystal material having at least a 180° twist and the driving circuit includes means for driving the liquid crystal panel with a bias value "a" greater than or equal to 2 and less than 4.

5. A liquid crystal device according to claim 4; wherein the nematic liquid crystal material has a positive dielectric anisotropy.

6. A liquid crystal device according to claim 4; wherein a surface of each of the first and second substrates is orientation processed such that the molecules of the liquid crystal material are arranged to have a small inclination with respect to the first and second substrates.

7. A liquid crystal device according to claim 4; wherein an angle between a transparent axis of the first polarizer and an orientation direction of the first substrate is 55°, an angle between a transparent axis of the second polarizer and an orientation direction of the second substrate is 55°, and an angle between the orientation direction of the first substrate and the orientation direction of the second substrate is 240°.

8. A liquid crystal device according to claim 4; wherein the bias voltage generating circuit includes means for applying a plurality of bias voltages of different levels to the liquid crystal panel depending upon the bias ratio.

9. A liquid crystal device according to claim 8; wherein the bias value "a" is 2 and the bias voltage generating circuit generates 3 bias voltages.

10. A liquid crystal device according to claim 8; wherein the bias value "a" is 3 and the bias voltage generating circuit generates 4 bias voltages.

11. A liquid crystal display device comprising: a pair of opposing substrates; a plurality of electrodes formed on each of the opposing substrates; a liquid crystal material layer interposed between the pair of opposing substrates and being optically reactive to signals applied to the electrodes, the liquid crystal material being of the type in which the molecules thereof have a natural helical twist of at least 180 degrees; a scanning circuit for sequentially applying scanning signals to a first group of electrodes; a data circuit for applying data signals to a second group of the electrodes in synchronism with the application of scanning signals to the first group of electrodes to selectively alter the optical state of selected regions of the liquid crystal material layer; and a bias voltage generating circuit for applying a bias voltage to selected ones of the plurality of electrodes with a bias value "a" greater than or equal to 2 and less than 4.

12. A liquid crystal device according to claim 11; wherein the liquid crystal material is a nematic liquid crystal material having a positive dielectric anisotropy.

13. A liquid crystal device according to claim 11; wherein a surface of each of the opposing substrates is orientation processed such that the molecules of the liquid crystal material are arranged to have a small inclination with respect to the opposing substrates.

14. A liquid crystal device according to claim 11; further comprising a first polarizer disposed on an external surface of a first one of the opposing substrates and a second polarizer disposed on an external surface of the second one of the opposing substrates; wherein an angle between a transparent axis of the first polarizer and an orientation direction of the first substrate is 55°, an angle between a transparent axis of the second polarizer and an orientation direction of the second substrate is 55°, and an angle between the orientation direction of the first substrate and the orientation direction of the second substrate is 240°.

15. A liquid crystal device according to claim 11; wherein the bias voltage generating circuit includes means for applying a plurality of bias voltages of different levels to the selected electrodes depending upon the bias ratio.

16. A liquid crystal device according to claim 15; wherein the bias value "a" is 2 and the number of bias voltages of different levels is 3.

17. A liquid crystal device according to claim 15; wherein the bias value "a" is 3 and the number of bias voltages of different levels is 4.

18. A liquid crystal device comprising: a liquid crystal panel having a pair of opposing polarizers, a pair of opposing substrates disposed on internal opposing surfaces of the respective polarizers and spaced apart by a gap, a plurality of opposing electrodes disposed on internal opposing surfaces of the respective substrates, and a liquid crystal layer provided in the gap between the opposing substrates and comprising a nematic liquid crystal material having a twisted helical structure of at least 180 degrees, the liquid crystal layer having optical characteristics which vary in response to an effective voltage applied thereto; and driving means for driving the liquid crystal panel on a time division basis in which a bias value "a" is greater than or equal to 2 and less than 4 such that the liquid crystal panel may be driven with a low voltage.

19. A liquid crystal device according to claim 17; wherein a number of duties in the time division driving basis is at least 16.

* * * * *